United States Patent
Wang et al.

(10) Patent No.: US 11,380,272 B2
(45) Date of Patent: Jul. 5, 2022

(54) DISPLAY UNIT, DRIVING METHOD THEREOF, AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Zhidong Wang, Beijing (CN); Yun Qiu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 669 days.

(21) Appl. No.: 16/334,342

(22) PCT Filed: Jun. 25, 2018

(86) PCT No.: PCT/CN2018/092627
§ 371 (c)(1),
(2) Date: Mar. 18, 2019

(87) PCT Pub. No.: WO2019/134351
PCT Pub. Date: Jul. 11, 2019

(65) Prior Publication Data
US 2021/0375216 A1  Dec. 2, 2021

(30) Foreign Application Priority Data
Jan. 2, 2018 (CN) .......................... 201810002329.X

(51) Int. Cl.
*G09G 3/34* (2006.01)
*G02F 1/1685* (2019.01)
(Continued)

(52) U.S. Cl.
CPC ............. *G09G 3/344* (2013.01); *G02F 1/167* (2013.01); *G02F 1/1677* (2019.01); *G02F 1/1685* (2019.01); *G02F 2001/1678* (2013.01)

(58) Field of Classification Search
CPC ....... G09G 3/344; G02F 1/167; G02F 1/1677; G02F 1/1685; G02F 2001/1678
See application file for complete search history.

(56) References Cited

U.S. PATENT DOCUMENTS

| 7,359,108 B2 | 4/2008 | Hayes et al. |
| 9,151,945 B2 | 10/2015 | Chang et al. |

(Continued)

FOREIGN PATENT DOCUMENTS

| CN | 108181706 A | * 6/2018 | ........... G02B 26/004 |
| KR | 20100117997 | * 11/2010 | ........... G02B 26/004 |

(Continued)

OTHER PUBLICATIONS

International Search Report and Written Opinion dated Oct. 12, 2018 in PCT/CN2018/092627.
1st Office Action dated Apr. 29, 2019 in CN201810002329.X.

*Primary Examiner* — Vinh T Lam
(74) *Attorney, Agent, or Firm* — Syncoda LLC; Feng Ma

(57) ABSTRACT

A display unit includes a first chamber, a second chamber, and a working fluid. The second chamber is spatially connected to the first chamber to form a continuous internal space with the first chamber, and the working fluid is disposed in the continuous internal space. The first chamber includes a transparent substrate and an opposing substrate having an opposing surface oppositely aligned with the transparent substrate. The working fluid can adjustably flow into the first chamber and cover the opposing surface, or to flow out of the first chamber and expose the opposing (Continued)

surface, to allow the display unit to realize a bright-state display or a dark-state display.

19 Claims, 6 Drawing Sheets

(51) Int. Cl.
  *G02F 1/1677* (2019.01)
  *G02F 1/167* (2019.01)
  *G02F 1/1675* (2019.01)

(56) References Cited

U.S. PATENT DOCUMENTS

| | | | |
|---|---|---|---|
| 9,207,448 B2 | 12/2015 | Jung et al. | |
| 9,323,043 B2 | 4/2016 | Bitman et al. | |
| 2016/0117976 A1* | 4/2016 | Matsumoto | G09G 3/344 |
| | | | 345/215 |

FOREIGN PATENT DOCUMENTS

| | | | | |
|---|---|---|---|---|
| KR | 101015614 B1 | * | 2/2011 | G02F 1/167 |
| KR | 101051930 B1 | * | 7/2011 | G02F 1/167 |
| KR | 20160048624 | * | 5/2016 | G02B 1/005 |
| KR | 2016090588 A | * | 8/2016 | G02F 1/167 |
| KR | 20160090588 A | * | 8/2016 | G02F 1/167 |
| KR | 102322588 B1 | * | 11/2021 | G09G 3/34 |
| WO | WO-2017214396 A1 | * | 12/2017 | G02B 26/00 |

* cited by examiner

In a first display state, applying a first group of voltages to the first electrode 104 and the second electrode 105, so that a first distance is maintained between the first electrode 104 and the second electrode 105, and the working fluid 107 is inside the second chamber 10b ⟶ S1

In a second display state, applying a second group of voltages to the first electrode 104 and the second electrode 105, so that a second distance that is smaller than the first distance is maintained between the first electrode 104 and the second electrode 105, and the working fluid 107 flows from the second chamber 10b to the first chamber 10a through the via 106 in the first substrate 101 ⟶ S2

FIG. 3

DISPLAY UNIT, DRIVING METHOD THEREOF, AND DISPLAY DEVICE

CROSS-REFERENCE TO RELATED APPLICATION

The present application claims priority to Chinese Patent Application No. 201810002329.X filed on Jan. 2, 2018, the disclosure of which is hereby incorporated by reference in its entirety.

TECHNICAL FIELD

The present disclosure relates generally to the field of display technologies, and more specifically to a display unit, driving method thereof and a display device.

BACKGROUND

A reflective display device is a display component/device whose display function is realized through reflecting lights in the environment. Examples of a reflective display device include electronic paper and reflective liquid crystal display device, etc. Because the display function of a reflective display device is realized through lights in the environment, the requirement of backlights can be skipped, the reflective display device is thereby a low power consumption display device. In recent years, the use of reflective display devices has become increasingly prevalent.

At present time, reflective display technologies represented by electronic-ink (E-ink) are rapidly developing. However, because particles are typically needed as an optical medium in its structure, and particles can agglomerate easily, it is unavoidable that the display effect will be negatively influenced.

SUMMARY

The purpose of the present disclosure provides a display unit, driving method thereof and a display device to solve the display effect problem caused by particle agglomeration.

In a first aspect, a display unit is disclosed.

The display unit includes a first chamber, a second chamber, and a working fluid. The second chamber is spatially connected to the first chamber to thereby form a continuous internal space with the first chamber, and the working fluid is disposed in the continuous internal space.

The first chamber comprises a transparent substrate and an opposing substrate having an opposing surface oppositely aligned with the transparent substrate. The working fluid is configured to adjustably flow into the first chamber and cover the opposing surface, or to flow out of the first chamber and expose the opposing surface, to thereby allow the display unit to realize one or another of a first-state display and a second-state display.

Herein the first-state display and the second-state display can be a bright-state display and a dark-state display respectively or a dark-state display and a bright-state display respectively.

According to some embodiments of the display unit, the second chamber is configured to adjustably change a volume thereof to thereby allow the working fluid to flow into the first chamber and cover the opposing surface, or to flow out of the first chamber and expose the opposing surface.

In the embodiments of the display unit described above, the display unit can further comprise a first electrode and a second electrode. The first electrode and the second electrode are insulatedly and oppositely arranged to form an electrical field in the second chamber, and the second chamber is configured to adjustably change the volume thereof through an attraction force or a repulsion force upon application of a voltage to the first electrode and the second electrode.

Optionally, the first electrode and the second electrode are both arranged in the second chamber. The first electrode is disposed over a side of the opposing substrate distal to the transparent substrate. The second electrode is disposed over a side of the first electrode distal to the transparent substrate. It is configured such that at least one dielectric layer is arranged between the first electrode and the second electrode.

Optionally, the second electrode comprises a flexible material and is arranged to surround the first electrode and contact with a pixel surrounding region of the opposing substrate.

According to some embodiments of the display unit, the opposing surface of the opposing substrate in the first chamber is light-absorbing dark colored, and the working fluid has a composition of a light-reflecting liquid.

Herein, optionally, the light-reflecting liquid comprises mercury or silicone oil. Optionally, the light-reflecting liquid is configured to be colored.

According to some other embodiments of the display unit, the opposing surface of the opposing substrate in the first chamber is light-reflecting, and the working fluid has a composition of a light-absorbing dark liquid.

According to some embodiments, the display unit is configured to be a transmissive display unit. The opposing substrate of the first chamber comprises a light-guiding panel, and the working fluid is configured to have a smaller refractive index than the opposing substrate such that a condition of total reflection is satisfied when the working fluid flows into the first chamber and covers the opposing surface of the opposing substrate.

According to some embodiments of the display unit, the second chamber also comprises the opposing substrate, and the opposing substrate is provided with at least one via spatially connecting the first chamber and the second chamber, wherein the at least one via is arranged at an unblocked region of the opposing substrate.

In a second aspect, the disclosure further provides a display device. The display device comprises at least one display unit, wherein each of the at least one display unit is based on any one of the embodiments of the display unit as described above.

According to some embodiments of the display device, each of the at least one display unit is a reflective display unit.

Optionally in the embodiments of the device as described above, a working liquid in the each of the at least four display units comprises one of:

a solution comprising C.I. Direct Blue 199 with a mass fraction of about 3%, glycerol with a mass fraction of about 5%, triethanolamine with a mass fraction of about 0.7%;

a solution comprising C.I. reactive red 23 with a mass fraction of about 2%, glycerol with a mass fraction of about 5%, triethanolamine with a mass fraction of about 1.5%;

a solution comprising C.I. reactive yellow 37 with a mass fraction of about 5%, glycerol with a mass fraction of about 5%, triethanolamine with a mass fraction of about 0.7%; or a solution comprising C.I. solubilised sulphur black 1 with a mass fraction of about 20%, glycerol with a mass fraction of about 5%.

According to some embodiments of the display device, each of the at least one display unit is a transmissive display unit.

In a third aspect, a method for driving a display unit is further provided. The method includes a step of switching between:

driving the working fluid to flow into the first chamber and cover the opposing surface to allow the display unit to realize a first display state; and driving the working fluid to flow out of the first chamber to allow the display unit to realize a second display state;

Herein the first display state and the second display state are respectively one and another of a bright display state and a dark display state.

According to some embodiments of the method, the second chamber is configured to adjustably change a volume thereof. As such, the driving the working fluid to flow into the first chamber and cover the opposing surface comprises reducing the volume of the second chamber, and the driving the working fluid to flow out of the first chamber comprises increasing the volume of the second chamber.

Optionally, the display unit comprises a first electrode and a second electrode insulatedly and oppositely arranged to form an electrical field in the second chamber. As such, the reducing the volume of the second chamber comprises applying a first group of voltages to the first electrode and the second electrode to thereby generate an attraction force between the first electrode and the second electrode; and the increasing the volume of the second chamber comprises applying a second group of voltages to the first electrode and the second electrode to thereby generate a repulsion force between the first electrode and the second electrode.

Herein, the first group of voltages can have opposite electrical properties, and the second group of voltages can be substantially zero.

Alternatively, the first group of voltages can be substantially zero, and the second group of voltages can have same electrical properties.

Other embodiments may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

FIG. 3 is a flow chart illustrating the driving method of the display unit in an embodiment of the present disclosure;

DETAILED DESCRIPTION

In the following, with reference to the drawings of various embodiments disclosed herein, the technical solutions of the embodiments of the disclosure will be described in a clear and fully understandable way. It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

In a first aspect, the present disclosure provides a display unit.

The display unit includes a first chamber, a second chamber, and a working fluid. The second chamber is spatially connected to the first chamber to thereby form a continuous internal space with the first chamber, and the working fluid is disposed in the continuous internal space.

The first chamber comprises a transparent substrate and an opposing substrate having an opposing surface oppositely aligned with the transparent substrate. The working fluid is configured to adjustably flow into the first chamber and cover the opposing surface, or to flow out of the first chamber and expose the opposing surface, to thereby allow the display unit to realize one or another of a first-state display and a second-state display.

Herein the first-state display and the second-state display can be a bright-state display and a dark-state display respectively or a dark-state display and a bright-state display respectively.

Figure 1:
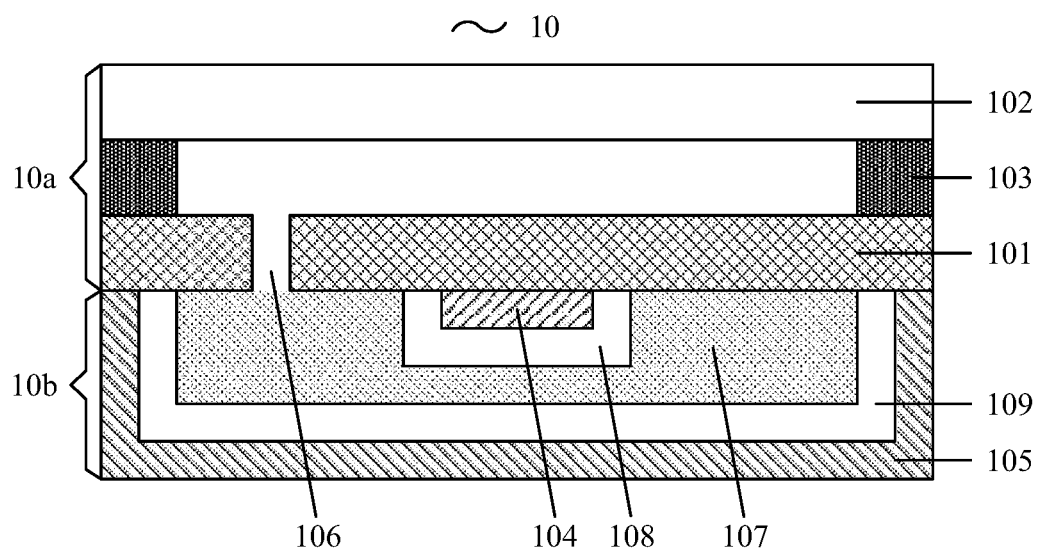
FIG. 1 is a structural diagram of the display unit in an embodiment of the present disclosure.

FIG. 1 illustrates a display unit according to some embodiments of the disclosure. As shown in FIG. 1, the display unit 10 comprises a first substrate 101 and a second substrate 102 which are configured to be facing to each other, and a side wall 103 located between the first substrate 101 and the second substrate 102.

The display unit 10 further comprises a first electrode 104 and a second electrode 105, which are both disposed over the first substrate 101. The second electrode 105 is arranged over a side of the first electrode 104 opposite to the second substrate 102, and further over a side of the first substrate 101 opposite to the second substrate 102. The second electrode 105 and the first electrode 104 are electrically insulated from each other.

The first substrate 101, the second substrate 102, and the sidewall 103 together form a first chamber 10a of the display unit 10. At least one via 106 is arranged in the first substrate 101. The second substrate 102 is a transparent substrate.

The second chamber 10b of the display unit 10 is formed between the first electrode 104 and the second electrode 105. The second chamber 10b is connected to the first chamber 10a through the via 106. A working fluid 107 is arranged inside the second chamber 10b, and the working fluid 107 is configured to be able to enter the first chamber 10a through the via 106 to thereby change the optical characteristics of the first chamber 10a.

Herein, the working fluid 107 can be non-conducting, which can be light-reflecting, light-absorbing or can break the conditions for total reflection and so on. With the working fluid 107 having different functions, the display unit 10 may have different optical characteristics.

It should be noted that the second electrode 105 is further configured to be able to be deformed under the influence of an attraction force or a repulsion force from the first electrode 104 to thereby cause the volume of the second chamber 10b to be changed. As such, the material of the second electrode 105 can be a material that can be easily deformed, such as flexible material or a thin film material.

In the display unit 10 disclosed herein, a via 106 is configured in the first substrate 101 so that the first chamber 10a and the second chamber 10b are connected to each other, and a working fluid 107 can be either inside the second chamber 10b or enter the first chamber 10a based on different voltages applied to the first electrode 104 and the second electrode 105, thereby altering the optical characteristics of the first chamber 10a.

As such, in the embodiments of the display unit as described above and illustrated in FIG. 1, the working fluid 107 is used as a display medium. Consequently, the phenomenon of particle agglomeration in a conventional display unit employing particles as the display medium in the display units can be avoided, and the display device employing the display units disclosed herein can thus have an improved display effect. In addition, depending on the different characteristics of the working fluid 107, not only a reflective display unit can be formed, a transparent display unit can also be formed, therefore broadening the display methods.

In the embodiments of the display unit as described above, the via 106 usually has a diameter in scales of micrometers (for example, smaller than 10 micrometers), and the actual size of the via 106 can be determined based on the size of the pixel.

In some embodiments of the display unit where the size of the pixel is relatively small, a via 106 with a relatively smaller diameter (for example, smaller than 5 micrometers) can be configured in the first substrate 101 of the display unit. In some other embodiments of the display unit where the size of the pixel is relatively large, a via 106 with a relatively larger diameter (for example, between 5 and 10 micrometers) can be configured in the first substrate 101 of the display unit.

In yet some other embodiments of the display unit where the size of the pixel is even larger, because a larger amount of working fluid 107 is needed, a plurality of vias are configured in the first substrate 101 of the display unit.

In embodiments of the display unit where the number of via 106 is one, the via 106 can be configured at a region of the first substrate 101 that is not blocked (i.e. unblocked region). Herein the unblocked region in the first substrate 101 is defined as a region where no other members (such as the sidewall 103, the first electrode 104, etc.) are arranged on the first substrate 101 to block the flow of the working fluid 107 through the via 106.

In embodiments of the display unit where the number of vias 106 are more than one (for example, 2), the plurality of vias 106 can be distributed uniformly in the unblocked region of the first substrate 101. For example, two vias 106 are symmetrically configured in the first substrate 101 at two sides of the first electrode 104 (i.e. orthographic projections of the two vias 106 on the second substrate 102 have a substantially equal distance to an orthographic projections of the first electrode 104).

It is noted that there is no limitation to the size of, the number of, and/or the positional configuration of, the via(s) 106 in the first substrate 101 in the display unit disclosed herein. The above examples serve illustrating purposes only, and shall not be interpreted to impose any limitations to the scope of the present disclosure.

It should be also noted, however, that the specific numbers, sizes, and positional configurations of the vias 106 should be determined based on the general principle of ensuring a smooth flow of the working fluid 107 between the first chamber 10a and the second chamber 10b in the display unit. For example, when the second chamber 10b is squeezed, the working fluid 107 can smoothly enter the first chamber 10a, and when the second chamber 10b is restored to its original shape, the working fluid 107 can smoothly return to the second chamber 10b.

In the embodiments of the display unit as described above and illustrated in FIG. 1, the first electrode 104 can be configured at a surface of the first substrate 101 opposite to the second substrate 102, or alternatively at a surface of the first substrate 101 facing the second substrate 102. In other words, as specifically shown in FIG. 1, the first electrode 104 can be arranged under, or alternatively over, the first substrate 101.

On this basis, a first dielectric layer 108 is further configured at a side of the first electrode 104 opposite to the first substrate 101. The first dielectric layer 108 is employed to electrically insulate the first electrode 104 from the second electrode 105 and/or the working fluid 107. Herein, the first electrode 104 can be configured at a center of the first substrate 101, and can be further configured not to overlap with the via 106 so as to ensure the via 106 is not blocked, ensuring that the working fluid 107 can smoothly flow between the first chamber 10a and the second chamber 10b.

In the embodiments of the display unit as described above, the second electrode 105 can be configured to be in contact with a pixel-surrounding region of the first substrate 101, and can be further configured to enclose the first electrode 104. For example, as shown in FIG. 1, the second electrode 105 is in contact with a surrounding region of the first substrate 101 and still forms an separated space with a central region of the first substrate 101; as such, the second electrode 105 and the first electrode 104 together form the second chamber 10b.

On this above basis, a second dielectric layer 109 is configured at a side of the second electrode 105 facing the first electrode 104, and the second dielectric layer 109 is employed to ensure the electrical insulation between the second electrode 105 and the first electrode 104 and the working fluid 107.

Figure 2:
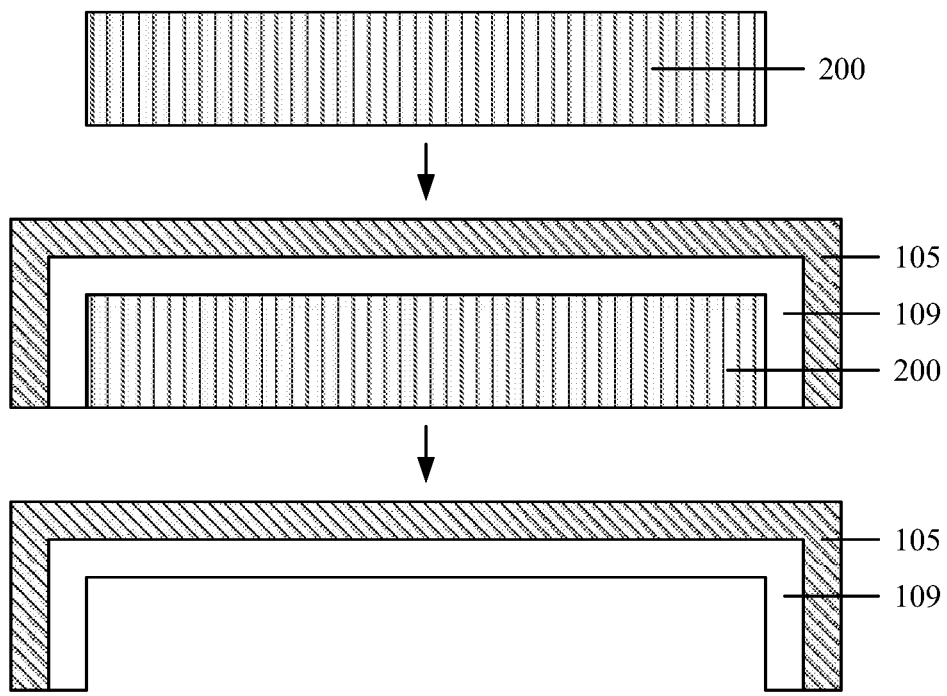
FIG. 2 is a diagram illustrating the manufacturing process of the second electrode of an embodiment of the present disclosure.

In this above embodiment of the display unit, the formation process of the second electrode 105 according to some embodiments of the disclosure is illustrated in FIG. 2. As shown in FIG. 2, the formation process includes the following steps.

S201: Forming a first sacrificial layer 200 over the side of the first substrate 101 where the second electrode is to be formed (not shown in FIG. 2, please refer to FIG. 1);

S202: Forming the second dielectric layer 109 over the sacrificial layer 200 such that the second dielectric layer 109 covers the sacrificial layer 200;

S203: Forming the second electrode 105 over the second dielectric layer 109 such that the second electrode 105 covers the second dielectric layer 109; and S204: Removing the sacrificial layer 200 via etching.

In the embodiments described above, one of the first substrate 101 and working fluid 107 can have a composition of a light-absorbing material, and the other can have a composition of a light-reflecting material. As such, bright-state display can be realized by reflecting the lights from the environment using the light-reflecting material, and dark-state display can be realized by absorbing the lights from the environment using the light-absorbing material.

In one specific embodiment of the display unit as shown in FIG. 1, the first substrate 101 can have a composition of a light-absorbing black colored substrate, and the working fluid 107 can have a composition of a light-reflecting liquid.

In this case, when no voltage is applied to the first electrode 104 and the second electrode 105, the working fluid 107 is located inside the second chamber 10b. At this time, the lights from the environment enter the first chamber 10a through the second substrate 102 and are absorbed by the first substrate 101, thus dark-state display is realized.

When voltages with opposite electrical properties are applied to the first electrode 104 and the second electrode 105, under the influence of the attraction force of the first electrode 104, the second electrode 105 moves towards the first electrode 104 until even becoming bonded to the first electrode 104 behind the insulation layers. The volume of the second chamber 10b is therefore reduced, then the working fluid 107 flows towards the first chamber 10a from the second chamber 10b. At this time, the lights from the environment enter the first chamber 10a through the second substrate 102 and are further reflected by the working liquid 107, to thereby realize a bright-state display.

It should be noted that the volume of the first chamber 10a should be smaller than the volume of the second chamber 10b, so that when the volume of the second chamber 10b is reduced, the working fluid 107 can fully cover the bottom of the first chamber 10a to even fill up the whole first chamber 10a.

In this embodiment, the light-reflecting liquid may be mercury Hg, silicone oil or other types of oil, and so on, and there are no limitation herein as long as it is a light-reflecting material.

On this basis, in order to realize a full-color display, the light-reflecting liquid can be a colorful liquid, and each display unit 10 can correspond to a liquid of one color. Taking CMYK four-color system (cyan, magenta, yellow and black) as an example, the colorful liquid can include cyan liquid, magenta liquid, yellow liquid, and black liquid.

As such, the cyan liquid can be a solution comprising C.I. Direct Blue 199 with a mass fraction of 3%, glycerol with a mass fraction of 5%, triethanolamine with a mass fraction of 0.7%, and fungicide with a mass fraction of 0.2%, The Magenta liquid can be a solution comprising CI reactive red 23 with a mass fraction of 2%, glycerol with a mass fraction of 5%, triethanolamine with a mass fraction of 1.5%, and fungicide with a mass fraction of 0.2%, The yellow liquid can be a solution comprising C.I. reactive yellow 37 with a mass fraction of 5%, glycerol with a mass fraction of 5%, triethanolamine with a mass fraction of 0.7% and fungicide with a mass fraction of 0.2%. The black liquid can be a solution comprising C.I. solubilised sulphur black 1 with a mass fraction of 20%, glycerol with a mass fraction of 5% and fungicide with a mass fraction of 0.2%.

It is noted that the aforementioned embodiment serves only as one illustrating example of the present disclosure, and shall not be construed as a limitation to the present disclosure. There is no limitation to the composition of the colorful liquid as well. As such, a full-color display is realized by means of the colorful liquids with light-reflecting characteristics. further, the problem in existing technologies that it is difficult to develop colorful particles when particles are employed as display medium is avoided.

In another embodiment of the display unit also shown in FIG. 1, the first substrate 101 is a light-reflecting substrate, and the working fluid 107 is a light-absorbing black liquid. In this case, when no voltage is applied to the first electrode 104 and the second electrode 105, the working fluid 107 is located inside the second chamber 10b. At this time, the light from the environment enters the first chamber 10a through the second substrate 102 and is reflected by the first substrate 101, to thereby realize a bright-state display When voltages of opposite electrical property are applied to the first electrode 104 and the second electrode 105, the second electrode 105 moves towards the first electrode 104 until even becoming bonded with the first electrode 104 behind the insulation layers under the influence of the attraction force of the first electrode 104. As a result, the volume of the second chamber 10b is reduced, and the working fluid 107 flows from the second chamber 10b to the first chamber 10a. At this time, the lights from the environment enter the first chamber 10a through the second substrate 102 and are absorbed by the working fluid 107, to thereby realize a dark-state display.

It should be noted that the volume of the first chamber 10a should be smaller than the volume of the second chamber 10b, so that when the volume of the second chamber 10b is reduced, the working fluid 107 can fully cover the bottom of the first chamber 10a, and can even fill up the first chamber 10a.

In this embodiment, the light-reflecting substrate may be a metal substrate such as aluminum (Al) substrate, or it may be a regular substrate provided with a reflecting layer such as a metal reflecting layer over a surface thereof.

According to some embodiment, the first substrate 101 can also be a light-guiding panel, and the working fluid 107 can be a liquid that satisfies the conditions for total reflection. A light source can be further configured at a lateral side of the light-guiding panel to thereby form a transparent display unit. For example, the refractive index of the working fluid 107 can be smaller than the refractive index of the first substrate 101, and larger than the refractive index of the air. In this case, when the working fluid 107 enters the first chamber 10a and distributes at the interface between the first substrate 101 and the first chamber 10a, the conditions for total reflection can be satisfied.

Specifically, as shown in FIG. 1, if no voltage is applied to the first electrode 104 and the second electrode 105, the working fluid 107 is located inside the second chamber 10b. At this time, the light emitted by the light source that is guided by the light-guiding panel enters the first chamber 10a, because the conditions for total reflection are not satisfied at the interface between the light-guiding panel and the first chamber 10a, the lights can in turn pass through the light-guiding panel and the first chamber 10a and come out of the second substrate 102, to thereby realize a bright-state display; in another.

If voltages of opposite electrical property are applied to the first electrode 104 and the second electrode 105, the second electrode 105 moves towards the first electrode 104 until even becomes bonded with the first electrode 104 behind the insulation layer under the influence of the attraction force of the first electrode 104. As a result, the volume of the second chamber 105 is reduced, and the working fluid 107 flows from the second chamber 10b to the first chamber 10a. At this time, the light that is emitted by the light source and guided by the light-guiding panel enters the first chamber 10a. Because the conditions for total reflection are satisfied at the interface of the light-guiding panel and the working fluid 107, it cannot emit out of it because of the total reflection of the working fluid 107, and a dark-state display is therefore realized.

It should be note that in the above embodiments of the display unit, the incident angle of the light can be controlled through configuration of optical components such as optical grating, thus the light at the interface of the first substrate 101 and the working fluid 107 can be controlled to satisfy the conditions for total reflection.

On the basis of the aforementioned display unit 10, in a second aspect of the present disclosure, a display device is provided, comprises a plurality of display units 10 arranged in an array. Herein, the display device can be a black and white display device or full-color display device depending on the types of the working fluid 107. The working principles of the display device has been described in detail in the aforementioned description of the display unit 10, and will not be repeated herein.

In a third aspect, the present disclosure further provides a driving method of the display unit as described above. As shown in FIG. 3, the driving method comprises the following steps:

S1: In a first display state, applying a first group of voltages to the first electrode 104 and the second electrode 105, so that a first distance is maintained between the first electrode 104 and the second electrode 105, and the working fluid 107 is inside the second chamber 10b;

S2: In a second display state, applying a second group of voltages to the first electrode 104 and the second electrode 105, so that a second distance that is smaller than the first distance is maintained between the first electrode 104 and the second electrode 105, and the working fluid 107 flows from the second chamber 10b to the first chamber 10a through the via 106 in the first substrate 101.

Herein, the first display state corresponds to one of the bright state or the dark state, the second display state corresponds to another of the bright state or the dark state.

In step S1, after applying the first group of voltages to the first electrode 104 and the second electrode 105, the distance between the first electrode 104 and the second electrode 105 is not sufficient for the working fluid 107 to flow from the second chamber 10b to the first chamber 10a.

In step S2, after applying the second group of voltages to the first electrode 104 and the second electrode 105, the second electrode 105 moves towards the first electrode 104 and reduces the volume of the second chamber 10b under the influence of the attraction force of the first electrode 104, so that the working fluid 107 can flow from the second chamber 10b into the first chamber 10a through the via 106 in the first substrate 101.

It should be noted that the first group of voltages and the second group of voltages are employed to control the volume of the second chamber 10b, therefore, any voltage values that can achieve the purpose of changing the volume of the second chamber 10b including positive voltages, negative voltages and zero voltages (i.e. no voltage is applied), can be the voltage values of the first group of voltages and the second group of voltages in this embodiment.

Specifically, in this embodiment, when applying voltages to the first electrode 104 and the second electrode 105, the following methods can be employed:

For example, in the first display state, no voltage is applied to the first electrode 104 and the second electrode 105, so that the working fluid 107 is located inside the second chamber 10b; whereas in the second display state, voltages of opposite electrical property are applied to the first electrode 104 and the second electrode 105, then the second electrode 105 moves towards the first electrode 104 under the influence of the attraction force of the first electrode 104, reducing the volume of the second chamber 10b, so that the working fluid 107 can flow from the second chamber 10b into the first chamber 10a to fill up the first chamber 10a through the via 106 in the first substrate 101.

In another example, in the first display state, voltages of the same electrical property are applied to the first electrode 104 and the second electrode 105, then the second electrode 105 moves in a direction opposing to the first electrode 104, under the influence of the repulsion force of the first electrode 104, increasing the volume of the second chamber 10b, so that the working fluid 107 will be located inside the second chamber 10b; whereas in the second display state, voltages of opposite electrical property are applied to the first electrode 104 and the second electrode 105, then the second electrode 105 moves towards the first electrode 104 under the influence of the attraction force of the first electrode 104, reducing the volume of the second chamber 10b, so that the working fluid 107 can flow from the second chamber 10b into the first chamber 10a and fill up the first chamber 10a through the via 106 in the first substrate 101.

In yet another example, in the first display state, voltages of the same electrical property are applied to the first electrode 104 and the second electrode 105, then the second electrode 105 will be under the influence of the repulsion force of the first electrode 104, and the volume of the second chamber 10b is increased, so that the working fluid 107 is located inside the second chamber 10b; whereas in the second display state, no voltage is applied to the first electrode 104 and the second electrode 105, then the volume of the second chamber 10b will be reduced absent the influence of the repulsion force, so that the working fluid 107 will flow from the second chamber 10b into the first chamber 10a to fill up the first chamber 10a through the via 106 in the first substrate 101.

The driving method of the display unit disclosed herein, through controlling the working fluid 107 to be inside the second chamber 10b or enter the first chamber 10a according to the different voltages applied to the first electrode 104 and the second electrode 105, the optical characteristics of the first chamber 10a is therefore changed. Because in the display unit/device described above, the working fluid 107 is employed as a display medium, the phenomenon of particle agglomeration that is frequently associated with a conventional display unit/device employing particles as the display medium can be avoided, and the display effect can be further improved. Furthermore, depending on the different nature of the working fluid 107, not only a reflective display unit/device can be realized, a transparent display unit/device can also be realized, therefore broadening the display methods.

In the following, two specified embodiments are provided to describe the driving method of the display unit in detail.

In the first embodiment, with reference to FIG. 1, the first substrate 101 is a light-absorbing dark substrate, and the working fluid 107 is a light-reflecting liquid. In this case, the first display state is a dark state, and the second display state is a bright state.

Figure 4:
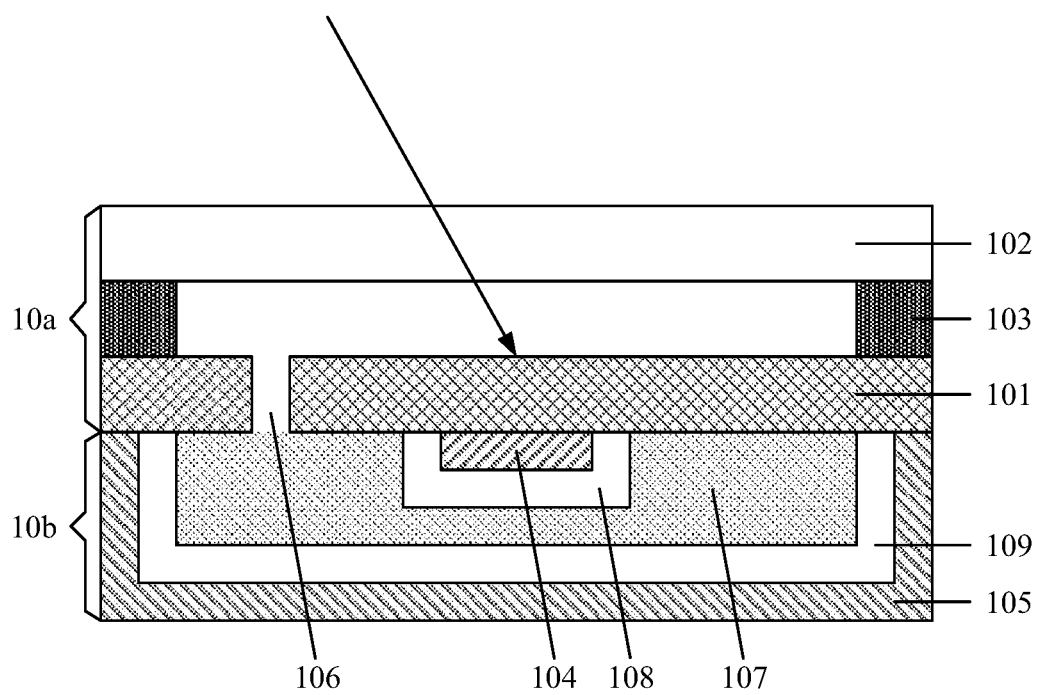
FIG. 4 is a diagram illustrating the working principles of the dark state display in an embodiment of the present disclosure.

As shown in FIG. 4, for example, when no voltage is applied to the first electrode 104 and the second electrode 105, the working fluid 107 is located inside the second chamber 10b. At this time, the light from the environment passes through the second substrate 102 and enters the first chamber 10a and is absorbed by the first substrate 101, thereby realizing the dark-state display for the display unit.

Figure 5:
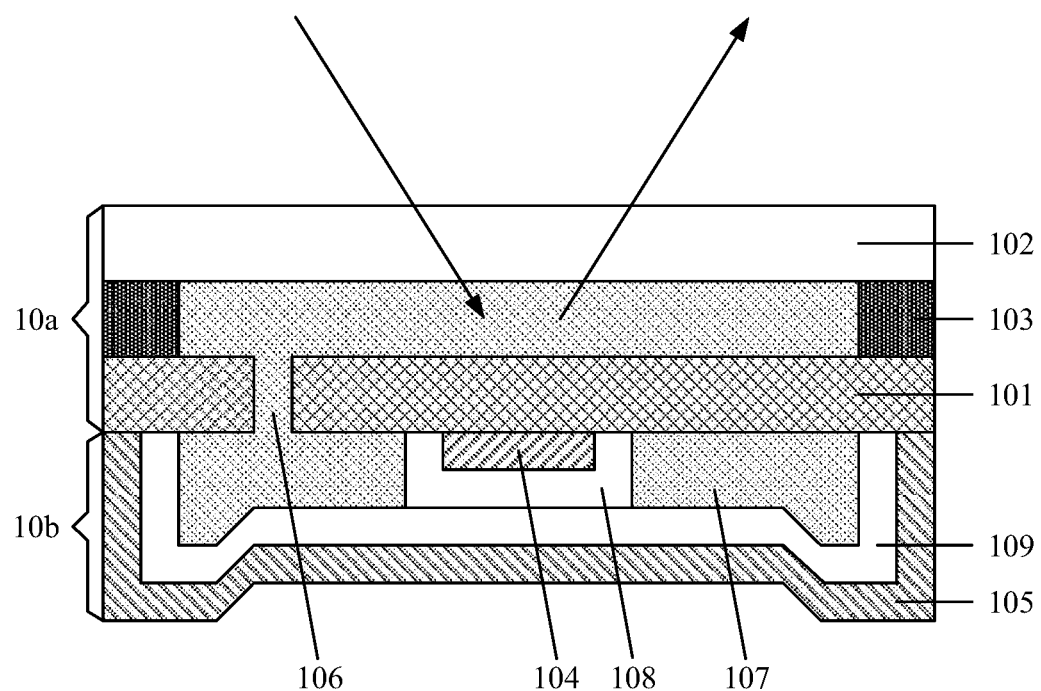
FIG. 5 is a diagram illustrating the working principles of the bright state display of an embodiment of the present disclosure.

Further as shown in FIG. 5, when voltages of opposite electrical property are applied to the first electrode 104 and the second electrode 105, the second electrode 105 moves towards the first electrode 104 until even becoming bonded with the first electrode 104 under the influence of the attraction force of the first electrode 104, thus the volume of the second chamber 10b is reduced, causing the the working fluid 107 to flow from the second chamber 10b into the first chamber 10a. At this time, the light from the environment enters the first chamber 10a through the second substrate 102 and is reflected by the working fluid 107, thereby realizing the bright-state display for the display unit.

If a full-color display is to be realized, colorful light-reflecting liquids can be employed. The specific principles for achieving full-color display have been described above, and will not be repeated herein.

In the second embodiment, with reference to FIG. 1, the first substrate is a light-reflecting substrate, and the working fluid 107 is a light-absorbing dark liquid. In this case, the first display state is the bright state, and the second display state is the dark state.

Figure 6:
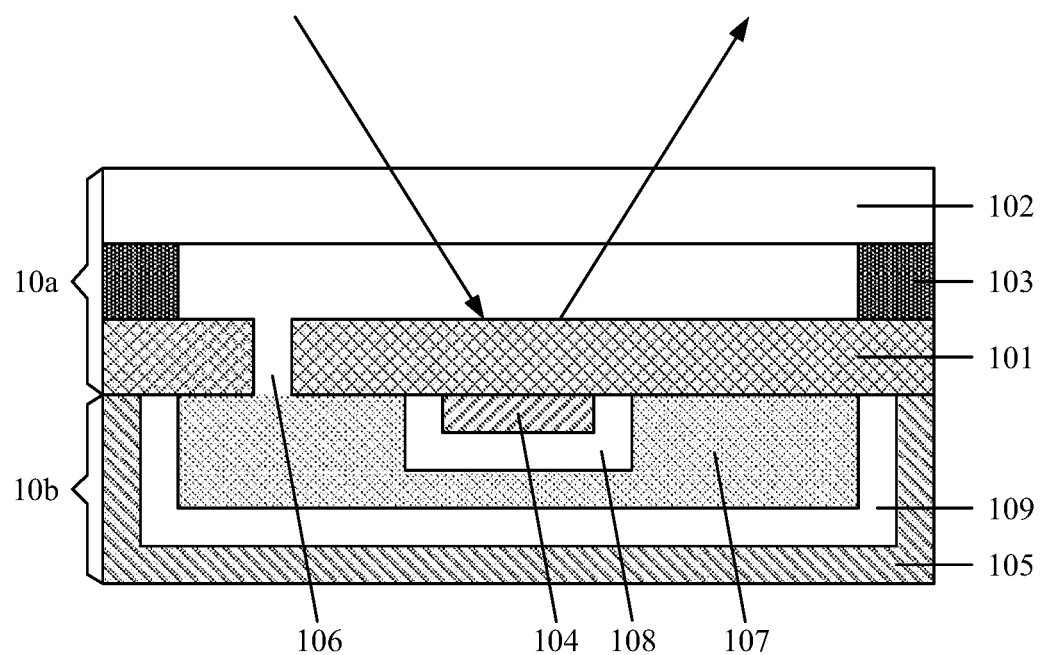
FIG. 6 is a diagram illustrating the working principles of the bright state display of another embodiment of the present disclosure.

As shown in FIG. 6, no voltage is applied to the first electrode 104 and the second electrode 105, the working fluid 107 is located inside the second chamber 10b. At this time, the light from the environment passes through the second substrate 102, enters the first chamber 10a, and is reflected by the first substrate 101, thus the bright-state display is realized for the display unit.

Figure 7:
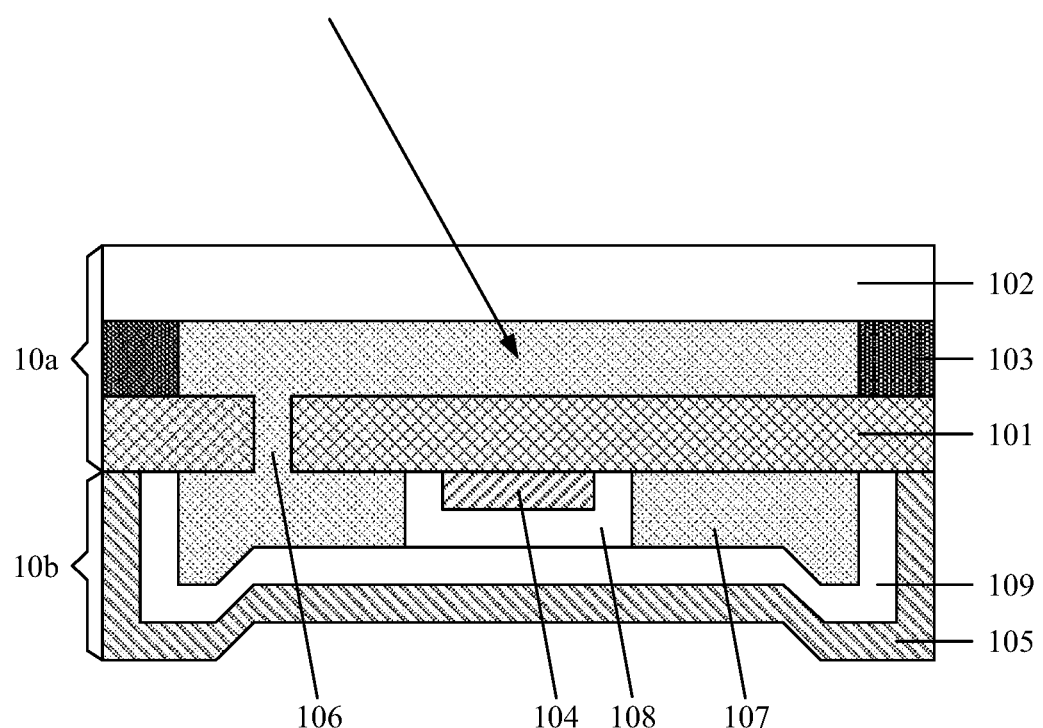
FIG. 7 is a diagram illustrating the working principles of the dark state display of another embodiment of the present disclosure.

Further as shown in FIG. 7, voltages of opposite electrical property are applied to the first electrode 104 and the second electrode 105, the second electrode 105 moves towards the first electrode 104 until even becoming bonded to the first electrode 104 under the influence of the attraction force of the first electrode 104, so that the volume of the second chamber 10b is reduced, causing the working fluid 107 to flow into the first chamber 10a from the second chamber 10b. At this time, the light from the environment passes through the second substrate 102, enters and first chamber 10a, and is absorbed by the working fluid 107, thus the dark-state display is realized for the display unit.

It should be noted that the display method of the display unit 10 can change according to the different nature of the working fluid 107, but commonly, the adjustment of the bright state and dark state is realized through controlling whether the working fluid 107 enters into the first chamber 10a or stays inside the second chamber 10b.

All references cited in the present disclosure are incorporated by reference in their entirety. Although specific embodiments have been described above in detail, the description is merely for purposes of illustration.

It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A display unit, comprising:
 a first chamber;
 a second chamber, spatially connected to the first chamber to thereby form a continuous internal space with the first chamber; and
 a working fluid, disposed in the continuous internal space; wherein:
 the first chamber comprises a transparent substrate and an opposing substrate having an opposing surface oppositely aligned with the transparent substrate;
 the working fluid is configured to adjustably flow into the first chamber and cover the opposing surface, or to flow out of the first chamber and expose the opposing surface, to thereby allow the display unit to realize one or another of a first-state display and a second-state display; and
 the working fluid comprises one of:
  a solution comprising Color Index (C.I.) Direct Blue 199 with a mass fraction of about 3%, glycerol with a mass fraction of about 5%, triethanolamine with a mass fraction of about 0.7%;
  a solution comprising Color Index (C.I.) reactive red 23 with a mass fraction of about 2%, glycerol with a mass fraction of about 5%, triethanolamine with a mass fraction of about 1.5%;
  a solution comprising Color Index (C.I.) reactive yellow 37 with a mass fraction of about 5%, glycerol with a mass fraction of about 5%, triethanolamine with a mass fraction of about 0.7%; or
  a solution comprising Color Index (C.I.) solubilised sulphur black 1 with a mass fraction of about 20%, glycerol with a mass fraction of about 5%.

2. The display unit of claim 1, wherein the second chamber is configured to adjustably change a volume thereof to thereby allow the working fluid to flow into the first chamber and cover the opposing surface, or to flow out of the first chamber and expose the opposing surface.

3. The display unit of claim 2, further comprising a first electrode and a second electrode, wherein:
 the first electrode and the second electrode are insulatedly and oppositely arranged to form an electrical field in the second chamber; and
 the second chamber is configured to adjustably change the volume thereof through an attraction force or a repulsion force upon application of a voltage to the first electrode and the second electrode.

4. The display unit of claim 3, wherein the first electrode and the second electrode are both arranged in the second chamber, wherein:
 the first electrode is disposed over a side of the opposing substrate distal to the transparent substrate;
 the second electrode is disposed over a side of the first electrode distal to the transparent substrate; and
 at least one dielectric layer is arranged between the first electrode and the second electrode.

5. The display unit of claim 4, wherein the second electrode comprises a flexible material and is arranged to surround the first electrode and contact with a pixel surrounding region of the opposing substrate.

6. The display unit of claim 1, wherein:
 the opposing surface of the opposing substrate in the first chamber is light-absorbing dark colored; and
 the working fluid has a composition of a light-reflecting liquid.

7. The display unit of claim 6, wherein the light-reflecting liquid comprises mercury Hg or silicone oil.

8. The display unit of claim 6, wherein the light-reflecting liquid is configured to be colored.

9. The display unit of claim 1, wherein:
 the opposing surface of the opposing substrate in the first chamber is light-reflecting; and
 the working fluid has a composition of a light-absorbing dark liquid.

10. The display unit of claim 1, wherein the display unit is configured to be a transmissive display unit, wherein:
 the opposing substrate of the first chamber comprises a light-guiding panel; and the working fluid is configured to have a smaller refractive index than the opposing substrate such that a condition of total reflection is satisfied when the working fluid flows into the first chamber and covers the opposing surface of the opposing substrate.

11. The display unit of claim 1, wherein the second chamber also comprises the opposing substrate, and the opposing substrate is provided with at least one via spatially connecting the first chamber and the second chamber, wherein the at least one via is arranged at an unblocked region of the opposing substrate.

12. A display device, comprising at least one display unit including the display unit according to claim 1.

13. The display device of claim 12, wherein each of the at least one display unit is a reflective display unit.

14. The display device of claim 12, wherein each of the at least one display unit is a transmissive display unit.

15. A method for driving a display unit according to claim 1, comprising a step of switching between:
 driving the working fluid to flow into the first chamber and cover the opposing surface to allow the display unit to realize a first display state; and
 driving the working fluid to flow out of the first chamber to allow the display unit to realize a second display state;
 wherein:
  the first display state and the second display state are respectively one and another of a bright display state and a dark display state.

16. The method according to claim 15, wherein the second chamber is configured to adjustably change a volume thereof, wherein:
 the driving the working fluid to flow into the first chamber and cover the opposing surface comprises reducing the volume of the second chamber; and
 the driving the working fluid to flow out of the first chamber comprises increasing the volume of the second chamber.

17. The method according to claim 16, wherein the display unit comprises a first electrode and a second electrode insulatedly and oppositely arranged to form an electrical field in the second chamber, wherein:
 the reducing the volume of the second chamber comprises applying a first group of voltages to the first electrode and the second electrode to thereby generate an attraction force between the first electrode and the second electrode; and
 the increasing the volume of the second chamber comprises applying a second group of voltages to the first electrode and the second electrode to thereby generate a repulsion force between the first electrode and the second electrode.

18. The method according to claim 17, wherein:
 the first group of voltages have opposite electrical properties; and
 the second group of voltages are substantially zero.

19. The method according to claim 17, wherein:
 the first group of voltages are substantially zero; and
 the second group of voltages have same electrical properties.

* * * * *